United States Patent [19]

Allen, Jr.

[11] 4,056,161

[45] Nov. 1, 1977

[54] SOUND ATTENUATION MATERIAL

[75] Inventor: Ralph W. Allen, Jr., Melrose, Mass.

[73] Assignee: Tillotson Corporation, Needham, Mass.

[21] Appl. No.: 627,278

[22] Filed: Oct. 30, 1975

[51] Int. Cl.² .............................................. G10K 11/04
[52] U.S. Cl. ...................................... 181/290; 181/294
[58] Field of Search ........................ 181/33 G, 33 GA

[56] References Cited

U.S. PATENT DOCUMENTS

| 2,866,730 | 12/1958 | Potchen et al. | 181/33 GA |
|---|---|---|---|
| 3,002,868 | 10/1961 | Boivin | 181/33 G |
| 3,143,457 | 8/1964 | Morris | 181/33 G |
| 3,424,270 | 1/1969 | Hartman et al. | 181/33 G |

FOREIGN PATENT DOCUMENTS

| 2,062,687 | 6/1972 | Germany | 181/42 |

*Primary Examiner*—Brooks H. Hunt
*Attorney, Agent, or Firm*—Kenway & Jenney

[57] ABSTRACT

The sound attenuation material disclosed in this application comprises, in its basic aspects, an outer layer, a sound absorption layer, and a sound barrier layer disposed between the sound absorption layer and outer layer and bonding them together.

3 Claims, 5 Drawing Figures

SOUND ATTENUATION MATERIAL

Over the years there have been developed a number of compositions, and laminated and coated articles, for use as vibration dampening and sound attenuation means. One such a sound and shock absorbing means is in the form of an adhesive tape and is shown in U.S. Pat. No. 3,217,832. The tape is manufactured by coating a woven webbing of plastic material such as nylon with a viscoelastic, tacky, filled composition comprising, inter alia, polybutene, petroleum oil, and barytes. The density of the composition is increased if vibration dampening is of prime importance and decreased for better sound absorption.

In U.S. Pat. No. 3,265,154 there is disclosed an acoustical panel comprising a first and second layer of sound absorbing material of different densities, each comprising glass fibers bonded together. The outer layer is provided with dimples and serves also as a decorative layer in certain applications. A septum layer, e.g., of metal foil or plastic screen, is disclosed to be provided between the sound absorbing layers where it is desired to provide even greater sound absorption qualities to the sound absorption layers.

An acoustic foam panel is disclosed in U.S. Pat. No. 3,196,975 comprising a flexible polyurethane foam having both open and closed cells. In some instances, as disclosed, a preformed plastic facing sheet is laminated to the acoustic foam layer.

The invention disclosed in U.S. Pat. No. 3,298,457 is an acoustical barrier treatment. In accordance with that invention, a structural sheet metal member, which is subject to high intensity acoustic vibration from a source located to one side of the member, has applied thereto an adherent first layer of relatively stiff viscoelastic material having a Young's modulus of elasticity that is substantially less than that of the metal sheet. To the outer surface of the first layer is adhered a second layer of a relatively soft, compliant material having a modulus of elasticity that is substantially less than that of the first layer and having dispersed or suspended therein particulate material of high density.

In U.S. Pat. No. 3,489,242 there is disclosed an acoustical panel comprising viscoelastic material filled with dense particulate material. The viscoelastic material can be any viscoelastic polymeric material capable of being compounded with the particulate solid as defined. There are a number of polymers disclosed including natural or synthetic rubbers such as nitrile rubber, vinyl or vinylidene chloride copolymers, and polyurethane elastomers, and EPDM polymers such as ethylene/propylene/nonconjugated diene in which the diene is 1.4 hexadiene, dicylopentadiene, 5 methylene-2-norbornene or 5-ethylidene-2-norbornene. The filled viscoelastic material is applied to a substrate to be damped and functions not only to dampen vibrations but also as a sound transmission barrier.

The invention in U.S. Pat. No. 3,424,270 involves a viscoelastic sound-blocking material with filler of high density particles. The viscoelastic material can be, for example, a polyvinyl chloride plastisol. Among the fillers disclosed is barium sulfate (barytes). Various laminated products can be made wherein a dense viscoelastic cores is backed on one side with, e.g., mineral fibers or particle board, and on the other side with a thin facing of, e.g., vinyl film or decorative wood veneer. The structures provided are characterized, according to the disclosure, by excellent sound transmission loss.

In U.S. Pat. No. 3,909,488, which issued on Sept. 30, 1975 and is assigned to Tillotson Corporation, the assignee of the present invention, there is disclosed a highly filled vinyl plastisol composition which, among other uses, can be employed to form tile such as wall tile used for noise abatement. The disclosure of this patent is herein incorporated by reference.

While many of the sound attenuating materials disclosed heretofore, as exemplified by the above patents, provide satisfactory performance in certain applications, none of them, of course, meet the requirements of vibration dampening and sound attenuation in all applications. This is because the requirements differ depending upon the particular environment, e.g., airplane, factory building, office, car, truck, etc.

In more recent years, protection against the effects of occupational noise exposure has become of even more critical concern. Rules and regulations on permissible noise exposure have been established by the Occupation Safety and Health Act of 1970 (OSHA). Accordingly, the demand for sound attentuation means to reduce noise levels in various environments to an acceptable level has increased since these standards were established.

SUMMARY OF THE INVENTION

The present invention is a sound attenuation material which comprises, in its basic aspects, an outer layer, a sound absorption layer, and a sound barrier layer disposed between the sound absorption layer and outer layer and bonding them together.

The outer layer in a more preferred embodiment is provided with reinforcing material so as to make the outer layer more wear resistant for some applications. It can also be provided with decorative features, if desired.

The sound attenuation material of this invention will be found useful in a variety of applications; for example, in trucks or other vehicles in the floor, and side or roof panels to decrease noise levels in the cab, and as a pipe wrap.

The sound attenuating material in some applications can, if desired, be provided with suitable pressure-sensitive adhesive on the exposed, or free side, of the sound absorption layer so that the material can be applied to, and will remain in relatively permanent contact with, some desired surface.

Quite advantageously, the invention provides a three prong approach to control of unwanted sound or noise: first, random incident sound is absorbed by the sound absorption layer; secondly, unwanted sound is blocked by the sound barrier layer and results in reduced sound transmission; and thirdly, vibration in surfaces to which the material is applied is reduced thereby tending to further help to lower sound levels in the environment in which it is used.

A further advantage in the use of sound attenuating material according to the invention is that the outer layer thereof permits the exposed surface of the material to be washed clean. Moreover, it permits the material to be used in relatively dusty areas in that it aids to prevent, as does the sound barrier layer, dust from the sound absorption layer which over a period of time could adversely affect its sound attenuation qualities.

BRIEF DESCRIPTION OF THE DRAWING

The invention will be better understood by referring to the drawing in conjunction with a reading of the specification wherein in.

DETAILED DESCRIPTION OF THE INVENTION AND PREFERRED EMBODIMENTS

Figure 1:
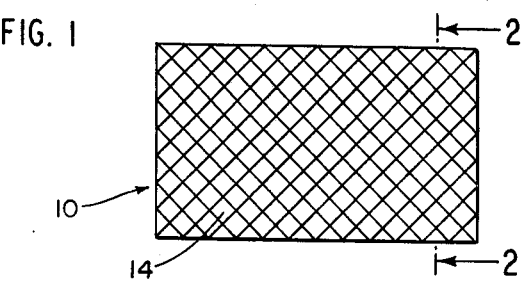
FIG. 1 is shown in plan view sound attenuating material according to the invention.
Figure 2:
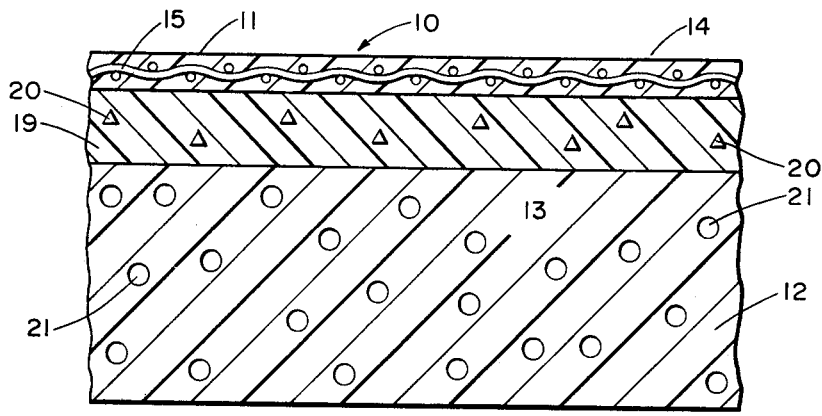
FIG. 2 is shown a cross-section of the sound attenuating material taken at lines 2—2.

Turning now to the drawing, there is shown in FIG. 1 thereof sound attenuation material 10. As shown in FIG. 2, sound attenuation material 10 comprises an outer layer 11, a sound absorption layer 12, and in between the outer layer and the sound absorption layer, and bonding the two layers together, a sound barrier layer 13.

Outer layer 11 can be of various materials so long as suitable wear resistant properties are provided, e.g., polyvinyl chloride, polyvinyl acetate, vinyl chloride-vinyl acetate copolymers, polyvinylidene chloride, and polyurethane. The preferred materials are plastisols of vinyl chloride or copolymers thereof. Various such materials are commercially available. Where higher wear resistant properties are desired, in general, the higher fusing resins will be found to offer better results; however, low fusing resins can be used in the practice of the invention.

Outer layer 11 provides not only wear resistant characteristics to the sound attenuating material, and dimensional stability, but may also be utilized to provide a somewhat decorative appearance. As an example, the outer layer can, as shown in FIG. 1, be provided with an embossed surface 14. This feature can be provided by various means as will be obvious to those skilled in the coating art. A decorative surface is often of particular advantage where sound attenuation material 10 is used in applications where outer layer 11 is exposed directly to view. The embossed surface may also provide a surface of more desirable frictional characteristics.

Figure 3:
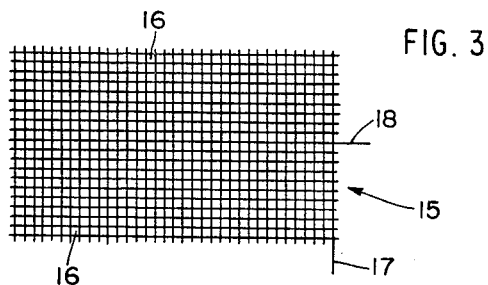
FIG. 3 is a plan view of a glass fiber screen used as a reinforcement in the outer layer of the sound attenuating material.

To provide even better wear resistance characteristics in the outer layer, outer layer 11 is preferably reinforced. One means, and the preferred manner, of accomplishing this is to include in outer layer 11 a woven fabric 15, preferably one having a plain weave construction as is shown in FIG. 3. However, it will be appreciated that fabrics of other weaves, and even other construction, for example, a non-woven construction, as well as other reinforcing material, can be used if desired. The reinforcing material can even be long staple fibers of, for example, glass.

The reinforcing material found particularly satisfactory in the practice of the invention is a woven fabric or screen of glass fibers yarns. Fibers of other materials can be used, however, such as, for example, those of man-made fibers such as nylon, polyester, and polypropylene, or those of metal fibers such as aluminium. The yarns can be monofilament or multifilament, and even of staple fibers in some cases, and of various yarn sizes or denier. The fabric or screen woven therefrom can be of any size mesh 16, so long as satisfactory wear characteristics are provided to the outer layer. In general, however, the smaller the mesh size of the screen or fabric used, the better will be the abrasion resistance. The fabric should not be so tightly woven, however, as to preclude penetration of outer layer material through mesh 16 so as to coat both sides of the fabric.

As will be appreciated, one can provide that the mesh size of woven fabrics of different yarn size or denier be the same, or very much the same, by varying the fabric construction. Where heavier yarns or fibers (warp 17, fill 18) are used, as might be desired with outer layers of greater thickness, for the fabric to have the same mesh size as with finer yarns, it will be necessary to use fabrics of lesser yarn count.

Obviously, the invention is not limited by the particular reinforcing material used in the outer layer, or its particular construction. Any of those materials conventionally used as reinforcement in, or offering abrasion resistance to, the coating materials disclosed herein will be, in general, found satisfactory. As a matter of fact, and as earlier mentioned, the practice of the invention does not necessarily involve reinforcement of the outer layer.

Of somewhat critical importance, however, is the composition of sound barrier layer 13 which functions not only to provide satisfactory sound transmission loss but as a vibration dampener as well. In its more basic aspects, sound barrier layer 13 is a relatively high density, in general the higher the better, layer such as is disclosed in U.S. Pat. No. 3,909,488. The disclosure of this patent as earlier mentioned is hereby incorporated by reference. Sound barrier layer 13 is a layer that exhibits minimum harmonic vibration and comprises a binder material 19 filled with particulate material 20, of relatively high density. The greater the volume of filler compared to the volume of binder material plus filler, the greater will be, of course, the density of barrier layer 13, for any particular filler material. This volume is limited, however, by the volume of binder material necessary to provide a composition that binds the particulate material together and that can be formed into an integral layer.

The binder can be of any of various materials, provided the binder material can be filled with particulate material to the extent desired to provide a suitable density. When loaded to the extent desired, sound barrier layer 13 will provide properties somewhat comparable to sound barrier layers of lead used heretofore; however, the sound barrier layer of the invention is attendant with at least one important distinguishing characteristic from a lead sound barrier layer; i.e., when the layer is subjected to a force and bent of, e.g., a planar configuration, on removal of the force, it will return to its initial position.

Any particulate material of relatively high specific gravity can be used as a filler provided the filler is compatible with the binder material to the extent needed to achieve the desired density. The fillers can be of various sizes and shapes; however, in general, the filler should be in a range of sizes, e.g., 2–25 microns, and of irregular shape so as to leave no large voids in the sound barrier layer. Examples of suitable filler materials include barium sulfate (barytes), calcium carbonate, limestone, kaolin, and blanc fixe (precipitated barium sulfate). The preferred filler is barium sulfate.

The composition of sound barrier layer 13 can also include components other than binder material 19 and filler 20, for example, dyes, pigments, heat stabilizers, and light stabilizers. It may be desirable, and in fact necessary that, in some applications the sound barrier layer be flame retardant. Various components can be added to the composition to accomplish this purpose, e.g., aluminium trihydrate. The amount added will depend somewhat on the particular composition. Some of these components may offer a dual function, e.g., as a filler and fire retardant.

The preferred sound barrier layer is of a higly filled vinyl plastisol composition such as is disclosed in U.S. Pat. No. 3,909,488. As disclosed therein the composition includes a lubricant such as butyl stearate. Various plasticizers can be used and some of those found suitable, e.g., tricresyl phosphate, can also provide fire retardant properties to the sound barrier layer. The amount of plasticizer and lubricant used in any specific composition will depend somewhat on the particular vinyl polymer or copolymer used, as well as the other components included therein. However, in general, the plasticizer and lubricant are employed in about equal parts by weight e.g., between about 5 and 15 weight percent based upon the weight of filler present. The sound barrier layer composition of this invention contain fillers in concentrations above about 300 weight percent and up to about 2500 weight percent, based upon the weight of the vinyl polymer.

Sound absorption layer 12 is preferably a polyurethane foam layer having open cells or pores 21 therein; however, foams of other materials, for example polyvinyl chloride will be found satisfactory so long as they provide the desired sound absorption characteristics, are solvent resistant, i.e., against gasoline, alkalis, and water, and meet Underwriter Laboratory Specification No. 94, i.e., are non-burning and permanently self-extinguishing. The preferred foam is a polyester based foam and is of a low density, e.g., 2 lbs./ft.$_3$, the lower the better. Such a foam is commercially available in various thicknesses. The optimum density and thickness for use in any particular application will depend upon the environment and amount of noise to be attenuated, and can be readily determined.

The overall thickness of the sound attenuation mat will, of course, depend upon the thickness of each of the layers, i.e., the combined thicknesses of sound absorption layer 12, sound barrier layer 13, and outer layer 11. The thicknesses of the sound absorption layer and sound barrier layer will be, in turn, somewhat determined by the amount and frequency of sound to be attenuated. It may be desirable in certain instances to provide further alternating sound barrier and absorption layers on top of those first provided.

Figure 4:
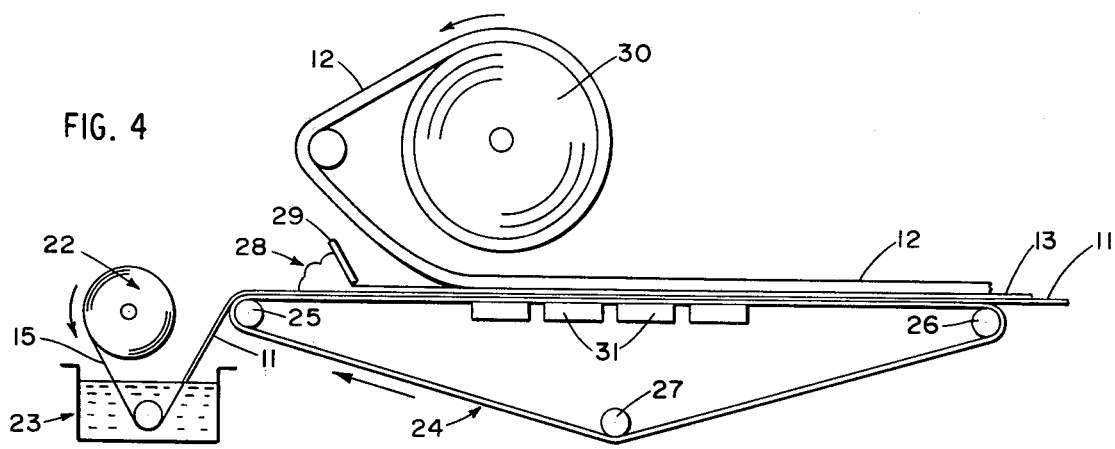
FIG. 4 is a schematic illustration of a process line for, and apparatus needed in, manufacturing sound attenuating material according to the invention.

Turning now to FIG. 4 of the drawing, there is shown therein a continuous process for the manufacture of sound attenuation material 10 according to the invention. The sound attenuation material, as shown in FIG. 2, is in general produced by forwarding glass fiber screen 15 from a roll 22 thereof to a coating station 23 wherein it is coated with a suitable material for use as outer layer 11. The preferred coating composition, as before mentioned, is a vinyl plastisol composition; however, other compositions can be used so long as they comprise 100% solids, i.e., involve no evaporation and attendant shrinkage. The composition can include other components as desired, e.g., dyes and pigments, fillers, fire retardants, antioxidants, and heat and light stabilizers.

The composition can first be prepared by adding the various components together in a Ribbon Blender and then transferring the composition to the vessel at coating station 23. The vinyl resin is first added to the blender, along with the various other components, and then the plasticizer is added.

The coated screen (outer layer 11) is then passed to an endless belt conveyor 24 (supported by rolls 25, 26, and 27) moving in the direction indicated by the arrows. The back side of outer layer 11 is then coated with highly loaded sound barrier layer composition 28 to form sound barrier layer 13. This layer is seen to be provided in FIG. 4 by means of a knife coater 29; however, it is obvious that such a layer can be provided by any means, e.g., knife over roll, air knife, floating knife, and the like.

The amount of outer layer composition picked up by screen 15 will depend on how thick an outer 11 is desired in sound attenuation material 10 to be formed. This will also depend somewhat on the construction of the particular reinforcement used; however, in general, a sufficient amount should be picked up on screen 15 to fill mesh 16 therein and provide a layer coating the screen. It is necessary to fill the mesh or interstices in the woven reinforcing material to prevent strikethrough of the sound barrier composition when it is coated onto the back side of the outer layer formed.

Screen 15 can be, if desired, already provided with a coating. In this event, this coating may be of the same material as that applied as the outer layer coating or not. The only criticality here is that the coating materials be compatible, i.e., adhere together, so that the outer layer be an integral layer.

Where the outer layer does not contain a woven reinforcement, the outer layer will be formulated of the desired composition and cast into a layer as by calendering or extrusion. The formation of such a layer and the means for accomplishing it are well known to those in the art and need not be described in any detail herein.

After formation of sound barrier layer 13, a layer 12 of sound absorption material, e.g., polyurethane foam, is withdrawn from a roll 30 thereof and is positioned on top of and in contact with the exposed surface back side of sound barrier layer 13.

This combination of layers is then heated by means of steam, or oil, heated platens 31 as shown in FIG. 4 of the drawing. These are located so that conveyor belt 24 is in traveling contact therewith. The plastisol composition on the glass fiber screen and sound barrier composition are heated to fusing conditions. This results in a sound attenuation material in which the layers thereof are joined together.

The exposed surface of the sound absorption layer of the sound attenuation material can be, if desired, provided with a coating of pressure-sensitive adhesive. The adhesive layer can be protected until the sound attenuation material is ready for use by laminating thereto a suitable release paper, of which a number are commercially available.

The particular pressure-sensitive adhesive formulation used will depend somewhat on the application to which the sound attenuating material is to be put, and whether the substrate on which the material is applied is metal, wood, plastic, or a surface of some other material. There are many pressure-sensitive adhesives in the art to choose from and their manner of application to a desired substrate is well known. On the other hand, no adhesive need be applied at this point and can, instead, be applied to the sound attenuation material, or the substrate to which it is to be applied, when it is ready for use in any particular application. In some applications, it may be more preferable to use a double face tape rather than applying a pressure-sensitive adhesive composition to either the sound attenuating material or substrate to which it is to be applied.

While sound attenuating material of the invention is normally manufactured in substantially continuous wide sheets, it is typical that the user will find it necessary to cut the material to varying dimensions in order to satisfy various applications. Obviously, this may be done as a final step in its manufacture where die cutting means of some specified shape are used.

It will be readily appreciated by those skilled in the laminating and coating art that the sound attenuation material of the invention need not be manufactured on a continuous basis. It can be manufactured in a final shape desired on a discontinuous basis.

The following example will, it is believed, better describe the most preferred embodiment of the invention.

EXAMPLE

A glass fabric screen of plain weave construction, coated previously with a polyvinyl chloride composition, and available commercially from Pfifer Wire Products, Inc. of Tuscaloosa, Alabama is withdrawn from a roll thereof and is passed under a partially submerged roll in a vessel containing the following composition:

| COMPONENTS | PARTS DRY WEIGHT |
|---|---|
| Bakelite VLFV[1] | 100 |
| Santicizer 148[2] | 100 |
| Ca CO$_3$ | 90 |
| | 290 |

[1]BAKELITE VLFV is a medium, low-molecular weight vinyl copolymer dispersion resin available from Union Carbide Corporation. It has a rapid gel rate and readily fuses between 275° F and 300° F.
[2]SANTICIZER 148 is available from Monsanto Company and is isodecyldiphenyl phosphate, a plasticizer and flame retardant.

The face of the coated screen is then placed against the surface of a traveling endless woven fabric belt whereby it is transported past a coating station and across steam heated platens. On to the back side of the coated screen is then applied (1 lb./ft.$^2$) of a filled plastisol composition (formulated as disclosed in U.S. Pat. No. 3,909,488) as follows:

| COMPONENTS | PARTS DRY WEIGHT |
|---|---|
| Bakelite VLFV | 100 |
| Aluminium trihydrate - H-10[1] | 600 |
| Barytes Foam A[2] | 300 |
| Barytes #22[3] | 300 |
| Butyl Stearate | 100 |
| Santicizer 148 | 100 |
| | 1500 |

[1]Aluminium trihydrate H-10: Available from Alcan Sales, Toronto, Canada.
[2]Barytes Foam A: Available from New England Resins & Pigment Company.
[3]Barytes #22: Density of 4.3 to 4.5, available from C. K. Mullin.

To the sound barrier layer thus formed is then applied a ¼ inch thick performed layer of open celled polyester-polyurethane foam having a density of 2 lbs./ft.$^3$.

The outer and sound barrier layer compositions are fused in passing over the steam heated platens (300° F). When the compositions fuse, the outer and sound barrier layers bond together. The foam layer is bonded to the sound barrier layer when fusion of this layer occurs.

On visual observation of the sound attenuation material, the surface of the outer layer is seen to have been embossed with the pattern of the woven fabric conveyor belt. This provides a decorative appearance and a surface that is of more desirable frictional characteristics.

Figure 5:
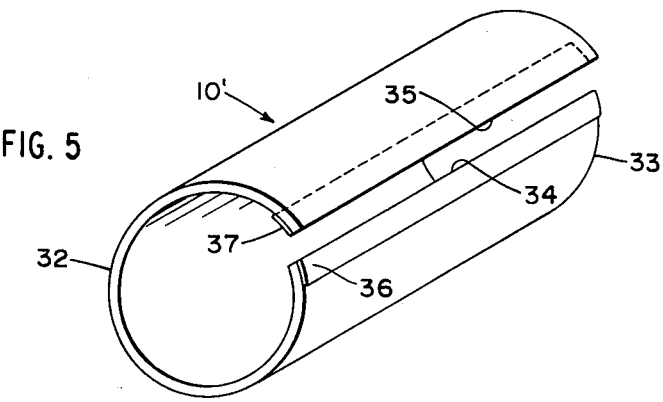
FIG. 5 is an isometric view of a pipe wrap made from the sound attenuating material disclosed herein.

The sound attenuation material of the invention can be used in various applications; however, one particular application is a pipe wrap 10' shown more clearly in FIG. 5. In this application, the sound attenuation material 10 is cut to the desired dimensions, i.e., length and width depending on the pipe to be wrapped, so as to provide lateral edges 32, 33 and longitudinal edges 34, 35. The longitudinal edges are then provided with fastening means such as the hook and loop fastening means available from American Velcro, Inc. of Manchester, New Hampshire. These fastening means are available in strip from 36, 37 and can be sewn to longitudinal edges 34, 35, respectively, as shown in the drawing. The pipe wrap is applied to a pipe (not shown in the drawing) by overlapping the edges as shown and the fastening means brought together so as to secure the wrap in place. This manner of fastening provides ease of application and removal of the pipe wrap and makes it unnecessary to be concerned with proper selection of adhesive and their formulations in application thereof and the problems concerned therewith, e.g., plasticizer migration, clean up problems, and adhesion.

As many different embodiments of the invention will occur to those skilled in the art, it is to be understood that the specific embodiments of the invention, as presented herein, are intended by way of illustration only and not limiting on the invention, but that the limitations thereon are to be determined only from the appended claims.

What is claimed is:

1. A sound attenuating material comprising a polyvinyl chloride wear resistant outer layer containing embedded fiber reinforcement, a sound absorption layer comprising a foam material, and a sound barrier layer interposed between said outer and sound absorption layers, said barrier layers comprising a polyvinyl chloride layer containing a particulate, high density filler in major proportion by weight based upon the weight of the polyvinyl chloride, said sound barrier layer also serving as a bonding layer laminating said outer and said sound absorption layers together, said sound attenuating material being operable to absorb vibration and to inhibit transmission thereof.

2. The sound attenuation material as set forth in claim 1 wherein the reinforcement in said outer layer comprises a woven glass fiber.

3. The sound attenuation material as set forth in claim 1 wherein the filler comprises barium sulfate.

* * * * *